(12) United States Patent
Hochkugler et al.

(10) Patent No.: US 9,725,686 B2
(45) Date of Patent: Aug. 8, 2017

(54) STRIP-FORM WC CLEANING PRODUCT (71) Applicant: Henkel AG & Co. KGaA, Duesseldorf (DE)

(72) Inventors: Sabine Hochkugler, Vienna (AT); Christian Reichert, Duesseldorf (DE); Robert Stephen Cappleman, Duisburg (DE); Michael Horn, Duesseldorf (DE); Keiwan Ebrahimzadeh, Duesseldorf (DE); Petra Plantikow, Duesseldorf (DE); Marc-Steffen Schiedel, Monheim (DE)

(73) Assignee: Henkel AG & Co. KAaA (DE)

( * ) Notice: Subject to any disclaimer, the term of this patent is extended or adjusted under 35 U.S.C. 154(b) by 185 days.

(21) Appl. No.: 14/505,567

(22) Filed: Oct. 3, 2014

(65) Prior Publication Data
US 2015/0020330 A1 Jan. 22, 2015

Related U.S. Application Data (63) Continuation of application No. PCT/EP2012/073662, filed on Nov. 27, 2012.

(30) Foreign Application Priority Data

Apr. 4, 2012 (DE) .................. 10 2012 205 512
Sep. 4, 2012 (DE) .................. 10 2012 215 615

(51) Int. Cl.
*B32B 27/04* (2006.01)
*C11D 17/04* (2006.01)
(Continued)

(52) U.S. Cl.
CPC ............ *C11D 17/044* (2013.01); *A47K 17/00* (2013.01); *A47L 13/17* (2013.01);
(Continued)

(58) Field of Classification Search
CPC ..... A61F 13/15723; A47L 13/17; C11D 1/83; B08B 1/006; A61L 2/00
(Continued)

(56) References Cited

U.S. PATENT DOCUMENTS

| 4,683,072 A | 7/1987 | Holdt et al. |
| 7,709,433 B2 | 5/2010 | Veltman et al. |
| 2011/0104970 A1* | 5/2011 | Barnholtz .............. D04H 1/407 442/1 |

FOREIGN PATENT DOCUMENTS

| CA | 2822487 A1 | 7/2012 |
| EP | 1229106 A1 | 8/2002 |
| WO | 2006/013321 A1 | 2/2006 |

OTHER PUBLICATIONS

PCT International Search Report (PCT/EP2012/073662) dated Aug. 2, 2013.

* cited by examiner

*Primary Examiner* — Monzer R Chorbaji
(74) *Attorney, Agent, or Firm* — P. Scott Smith (57) ABSTRACT

A strip-form toilet cleaning product comprising a width (B), a height (H) and a thickness (S), wherein the ratio between width (B), height (H) and thickness (S) is between 1:1:0.01 and 1:0.1:0.2, a first extruded phase and at least one second extruded phase, wherein at least the contour of a contact surface (4, 4a, 4b) along the center axis (8) takes the form of a sine wave which has an amplitude of $A_{1,O}$, wherein the ratio of amplitude to width (B) $A_{1,O}$:B amounts to between 1:10 and 1:25 and the periodic length of the sine wave corresponds to 0.1-1 times the width (B) of the toilet cleaning product.

13 Claims, 6 Drawing Sheets

(51) Int. Cl.
*C11D 17/00* (2006.01)
*C11D 17/06* (2006.01)
*A47K 17/00* (2006.01)
*A47L 13/17* (2006.01)
*B29C 47/00* (2006.01)
*B29C 47/06* (2006.01)
*E03D 9/02* (2006.01)
*B29K 105/00* (2006.01)
*B29L 9/00* (2006.01)

(52) U.S. Cl.
CPC ...... *B29C 47/0004* (2013.01); *B29C 47/0014* (2013.01); *B29C 47/064* (2013.01); *C11D 17/0056* (2013.01); *C11D 17/06* (2013.01); *B29K 2005/00* (2013.01); *B29K 2105/0005* (2013.01); *B29L 2009/00* (2013.01); *E03D 9/022* (2013.01)

(58) Field of Classification Search
USPC .......................................... 422/1; 428/297.4
See application file for complete search history.

STRIP-FORM WC CLEANING PRODUCT

FIELD OF THE INVENTION

The present invention generally relates to a multiphase, strip-four toilet cleaning product for application in the interior of a toilet bowl and to a method for producing the strip-form toilet cleaning product.

BACKGROUND OF THE INVENTION

Mass-form toilet cleaning agents have already long been used in the toilet bowl under the rim ("rim blocks") and in the cistern ("cistern blocks"). The formulations generally contain surfactants, disinfectants and bleaching agents, salts, acids, complexing agents, fillers, colorants and scents, erosion regulators and/or further components. During production, the ingredients are generally mixed, compressed and then extruded into strands. The strands are finally cut to the desired length and optionally placed in toilet baskets.

A number of effects can be achieved such a toilet block. The toilet bowl may, for example, be cleaned and/or disinfected. It is furthermore also possible, for example, to inhibit unpleasant odors or to fragrance with a perfume. The ingredients required for these various effects are, however, not always compatible with one another. Sensitive substances, such as colorants, may accordingly, for example, be attacked by antimicrobially active bleaching agents; acids or complexing agents, which are used for preventing lime, rust or urine scale deposits, are, for example, often not compatible with perfume. Such toilet blocks with multiple uses therefore advantageously take the form of multiphasic blocks. The various phases may here be provided with different colors in order also to inform consumers about the multiple uses. The various phases may here be arranged either horizontally one on top of another or vertically next to or behind one another.

In addition to toilet blocks, which are positioned in a toilet basket under the rim of a toilet, self-adhesive strip-form toilet cleaning products, which a user sticks in the toilet bowl, where they then adhere and are flushed away by the flush water, have been obtainable for some considerable time. These strips have previously only been produced in simple geometries. Such strips conventionally have a rectangular basic shape.

It would therefore be desirable for esthetically more attractive strip-form toilet cleaning products of the above-stated kind to be available.

The object of the present invention is accordingly to provide a strip-form toilet cleaning product which is esthetically more attractive to a user. A further object of the invention is to provide a multiphase, strip-form toilet cleaning product which, when applied onto a ceramic surface by a user, does not break apart along the phase boundaries. It is furthermore an object of the invention to offer the strip-form toilet cleaning product in a package which permits simple and reliable application of the toilet cleaning product in a toilet bowl.

Furthermore, other desirable features and characteristics of the present invention will become apparent from the subsequent detailed description of the invention and the appended claims, taken in conjunction with the accompanying drawings and this

BRIEF SUMMARY OF THE INVENTION

A strip-form toilet cleaning product (1) for application in the interior of a toilet bowl comprising a width (B), a height (H) and a thickness (S), wherein the ratio between width (B), height (H) and thickness (S) is between 1:1:0.01 and 1:0.1:0.2, a first extruded phase (2) and at least one second extruded phase (3), wherein the first phase (2) differs from at least the second phase (3), wherein however all the phases (2, 3, 7) comprise at least one adhesion promoter at least on the side of the toilet cleaning product (1) to be applied onto the toilet bowl and the first phase (2) and at least the second phase (3) have a contact surface (4) with one another wherein at least the contour of a contact surface (4, 4a, 4b) along the center axis (8) takes the form of a sine wave which has an amplitude of $A_{1,O}$, wherein the ratio of amplitude to width (B) $A_{1,O}$:B amounts to between 1:10 and 1:25 and the periodic length of the sine wave corresponds to 0.1-1 times the width (B) of the toilet cleaning product (1).

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The strip-form toilet cleaning product according to the invention for application in the interior of a toilet bowl comprises a width (B), a height (H) and a thickness (S), wherein the ratio between width (B), height (H) and thickness (S) is between 1:1:0.01 and 1:0.1:0.2, a first extruded phase and at least one second extruded phase, wherein the first phase differs from at least the second phase, wherein however all the phases comprise at least one adhesion promoter at least on the side of the toilet cleaning product to be applied onto the toilet bowl and the first phase and at least the second phase have a contact surface with one another wherein at least the contour of a contact surface along the center axis takes the form of a sine wave which has an amplitude of $A_{1,O}$, wherein the ratio of amplitude to width (B) $A_{1,O}$:B amounts to between 1:10 and 1:25 and the periodic length of the sine wave corresponds to 0.1-1 times the width (B) of the toilet cleaning product.

It has surprisingly been found that, in comparison with linear contact surfaces, the sinusoidal configuration of the contact surface between the extrudate phases has significantly greater stability of the phase boundaries, in particular when the strip-form toilet cleaning product is being pressed onto a toilet surface by a user, so preventing the extrudate phases from breaking apart. The improved stability of the phase boundaries is moreover also manifested when opening a film pouch which encloses the toilet cleaning product, a matter which will be addressed in greater detail below.

In a preferred development of the invention, the first phase and the at least second phase of the strip-form toilet cleaning product have the same width.

According to a further preferable development of the strip-form toilet cleaning product, the first phase and at least the second phase, preferably all the phases, have substantially the same height ($H_1$, $H_2$, $H_3$).

For the purposes of the present application, "strip-form" is taken to mean a toilet cleaning product with a substantially flat body, the superficial dimensions of which are substantially larger the thickness thereof. The strip-form toilet cleaning product accordingly in particular has a width (B), a height (H) and a thickness (S), wherein the ratio between width (B), height (H) and thickness (S) is between 1:1:0.01 and 1:0.1:0.2.

Particularly preferably, the total height of the toilet cleaning product amounts to between 20 and 40 mm, preferably between 25 and 30 mm, the total width of the toilet cleaning product is between 50 and 75 mm, preferably between 60 and 70 mm and the thickness of the toilet cleaning product amounts to between 2 and 7 mm, preferably between 3 and 6 mm.

It is moreover advantageous for the first phase and at least the second phase, preferably all the phases, to have substantially the same thickness (S).

In an advantageous further development of the invention, the two widthwise sides which define the toilet cleaning product have a contour which substantially corresponds to the contour of the contact surface.

The density of the toilet cleaning product is preferably adjusted such that it amounts to between 1 and 5 $g/cm^3$, preferably between 1 and 3 $g/cm^3$, particularly preferably between 1.1 and 1.5 $g/cm^3$. The density is thus adjusted in such a manner that the self-adhesive, strip-form toilet cleaning product for application inside a toilet bowl, in particular on vertical or at least inclined surfaces inside a toilet bowl, can provide sufficient quantities of active substances for cleaning and fragrancing, while simultaneously not being too heavy for a detachable adhesive joint between the toilet surface and the toilet cleaning product.

Adhesion Promoters

All the phases of the toilet cleaning product according to the invention comprise at least one adhesion promoter. The adhesion promoter enables adhesion of the toilet cleaning product to a ceramic surface, in particular within a toilet bowl.

The adhesion promoter is preferably designed such that a detachable adhesive joint is formed between the ceramic surface and the toilet cleaning product.

It is in principle possible and also preferred for the adhesion promoter to be a component of the extruded toilet cleaning product, i.e. the adhesion promoter is added to the formulation of the toilet cleaning product prior to extrusion. This has in particular the advantage that the adhesion promoter also acts at the phase boundaries of the extruded phases, such that the phase boundaries can be further strengthened.

It is thus in particular preferred for the adhesion promoter between the phase boundaries and on the side of the toilet cleaning product to be applied onto the toilet bowl to be identical.

According to an advantageous development of the invention, the adhesion promoter contains an ester of polyisobutene-succinic acid.

Polyisobutene-succinic acid is taken to mean oligomeric or polymeric macromolecules with an oligomer residue or polymer residue which is derived from isobutene and has, at the ends thereof, one or two residues derived from succinic acid, i.e. residues of formula SA

—CH(COOH)CH$_2$COOH  (SA)

and accordingly 2 or 4 carboxyl groups, and mixtures thereof.

Polyisobutene-succinic acids may therefore be described by the following formulae IIa and IIb:

PIB—CH(COOH)CH$_2$COOH  (IIa)

PIB'—[CH(COOH)CH$_2$COOH]$_2$  (IIb)

wherein PIB in formula IIa denotes a monovalent oligomer residue or polymer residue derived from polyisobutene and PIB' in formula IIb denotes a divalent oligomer residue or polymer residue derived from polyisobutene.

In the esters of polyisobutene-succinic acid used according to the invention, at least one of the carboxyl groups is present in the form of the ester with a poly-$C_2$-$C_4$-alkylene glycol or a poly-$C_2$-$C_4$-alkylene glycol mono-$C_1$-$C_{22}$-alkyl ether.

Preferred esters of polyisobutene-succinic acid are those which are described in patent application WO 2012/095404 A1.

Instead of or in addition to this polyisobutene-succinic acid ester, the toilet cleaning product according to the invention may also contain other adhesion promoters. These are conventionally thickeners which enable adhesion of the agent according to the invention to the surface of the toilet and impart the desired consistency to the agent. Any viscosity regulators conventionally used in washing and cleaning agents are suitable for this purpose, these including for example organic natural thickeners (agar-agar, carrageenan, tragacanth, gum arabic, alginates, pectins, polyoses, guar flour, locust bean flour, starch, dextrins, gelatin, casein), modified organic natural substances (carboxymethylcellulose and other cellulose ethers, hydroxyethylcellulose and hydroxypropylcellulose and the like, seed flour ethers), completely synthetic organic thickeners (polyacrylic and polymethacrylic compounds, vinyl polymers, polycarboxylic acids, polyethers, polyimines, polyamides) and inorganic thickeners (polysilicic acids, phyllosilicates, clay minerals such as montmorillonites, zeolites, silicas). In addition to conventional thickeners, further conventional ingredients of cleaning agents, for example surfactants, may additionally act as adhesion promoters.

Preferred thickeners are polysaccharides and heteropolysaccharides, in particular polysaccharide gums, for example gum arabic, agar, alginates, carageenans and the salts thereof, guar, guaran, tragacanth, gellan, ramsan, dextran or xanthan and the derivatives thereof, for example propoxylated guar, and mixtures thereof. Other polysaccharide thickeners, such as starches or cellulose derivatives, may be used as an alternative to, but preferably in addition to a polysaccharide gum, for example starches of the most varied origins and starch derivatives, for example hydroxyethyl starch, starch phosphate esters or starch acetates, or carboxymethylcellulose or the sodium salt thereof, methyl-, ethyl-, hydroxyethyl-, hydroxypropyl-, hydroxypropylmethyl- or hydroxyethylmethylcellulose or cellulose acetate.

In addition to the stated thickeners, those substances which are conventionally used as pressure-sensitive adhesives may also be used as adhesion promoters. These include for example adhesive polymers. It should, however, be noted that the toilet cleaning product must be formulated in such a manner that the joint between cleaning product and toilet bowl is made not permanently, but instead reversibly; i.e. the adhesive forces must not act too strongly so that no adhesive residues remain once the service life has elapsed.

The adhesion promoter is preferably a component of the toilet cleaning product composition which is to be extruded. It is, however, also possible for the adhesion promoter to be added to the extruded toilet cleaning product after extrusion. This may proceed, for example, in the form of a single- or double-sided adhesive strip ("carpet adhesive tape") or also in the form of an adhesive applied over an extensive area or in spots. In particular, it is also conceivable to spray a suitable adhesive onto one side of the strip-form toilet cleaning product. In these cases, the adhesion promoter is arranged on the side of the toilet cleaning product which is applied onto the ceramic surface.

It is, of course, also conceivable for both a formulation component of the toilet cleaning product and in addition also an adhesive strip or applied adhesive to be used as adhesion promoter.

Surfactants

In a preferred embodiment, the toilet cleaning product according to the invention contains at least one surfactant. The latter is preferably selected from the group comprising anionic surfactants, nonionic surfactants, amphoteric surfactants, and cationic surfactants, and mixtures thereof. In a preferred embodiment, the surfactant is at least one nonionic surfactant.

Nonionic Surfactants

Nonionic surfactants for the purposes of the invention may be alkoxylates such as polyglycol ethers, fatty alcohol polyglycol ethers, alkylphenol polyglycol ethers, end group-terminated polyglycol ethers, mixed ethers and hydroxy mixed ethers and fatty acid polyglycol esters. Ethylene oxide/propylene oxide block polymers, fatty acid alkanolamides and fatty acid polyglycol ethers are likewise usable. A further important class of nonionic surfactants which can be used according to the invention are polyol surfactants and in this case in particular glyco-surfactants, such as alkyl polyglycosides and fatty acid glucamides. Alkyl polyglycosides are more preferred, in particular alkyl polyglucosides, wherein the alcohol is more preferably a long-chain fatty alcohol or a mixture of long-chain fatty alcohols with branched or unbranched $C_8$ to $C_{18}$ alkyl chains and the degree of oligomerization (DP) of the sugars is between 1 and 10, preferably 1 to 6, in particular 1.1 to 3, extremely preferably 1.1 to 1.7, for example $C_{8-10}$-alkyl-1.5-glucoside (DP of 1.5). In addition, fatty alcohol ethoxylates (fatty alcohol polyglycol ethers) are also preferred, in particular unbranched or branched, saturated or unsaturated $C_{8-22}$ alcohols alkoxylated with ethylene oxide (EO) and/or propylene oxide (PO) with a degree of alkoxylation of up to 30, preferably ethoxylated $C_{12-22}$ fatty alcohols with a degree of ethoxylation of less than 30, preferably 12 to 28, in particular 20 to 28, more preferably 25, for example $C_{16-18}$ fatty alcohol ethoxylates with 25 EO.

The products according to the invention may preferably furthermore contain at least one anionic surfactant. Preferred anionic surfactants are here fatty alcohol sulfates, fatty alcohol ether sulfates, dialkyl ether sulfates, monoglyceride sulfates, alkylbenzenesulfonates, olefin sulfonates, alkanesulfonates, ether sulfonates, n-alkyl ether sulfonates, ester sulfonates and lignin sulfonates. Likewise usable for the purposes of the present invention are fatty acid cyanamides, sulfosuccinates (sulfosuccinic acid esters), in particular sulfosuccinic acid mono- and di-$C_8$-$C_{18}$-alkyl esters, sulfosuccinamates, sulfosuccinamides, fatty acid isethionates, acylamino alkanesulfonates (fatty acid taurides), fatty acid sarcosinates, ether carboxylic acids and alkyl (ether) phosphates and α-sulfofatty acid salts, acyl glutamates, monoglyceride disulfates and alkyl ethers of glycerol disulfate.

Fatty alcohol sulfates and/or fatty alcohol ether sulfates, in particular fatty alcohol sulfates, are preferred for the purposes of the present invention. Fatty alcohol sulfates are products of sulfation reactions on corresponding alcohols, while fatty alcohol ether sulfates are products of sulfation reactions on alkoxylated alcohols. A person skilled in the art will here generally take alkoxylated alcohols to mean the reaction products of alkylene oxide, preferably ethylene oxide, with alcohols, for the purposes of the present invention preferably with longer-chain alcohols. As a rule, a complex mixture of addition products of different degrees of ethoxylation is obtained from n mol of ethylene oxide and one mol of alcohol, depending on the reaction conditions. A further embodiment of alkoxylation involves the use of mixtures of alkylene oxides, preferably a mixture of ethylene oxide and propylene oxide. Preferred fatty alcohol ether sulfates are the sulfates low-ethoxylated fatty alcohols with 1 to 4 ethylene oxide units (EO), in particular 1 to 2 EO, for example 1.3 EO. Preferred alkylbenzenesulfonates are in particular those with around 12 C atoms in the alkyl moiety, for instance linear sodium $C_{10-13}$-alkylbenzenesulfonate. Preferred olefinsulfonates have a carbon chain length of 14 to 16.

The anionic surfactants are preferably used as sodium salts, but may also be present as other alkali or alkaline earth metal salts, for example magnesium salts, and in the form of ammonium or mono-, di-, tri- or tetraalkylammonium salts, in the case of sulfonates, also in the form of their corresponding acid, for example dodecylbenzenesulfonic acid.

In addition to the previously stated types of surfactants, the agent according to the invention may furthermore also contain cationic surfactants and/or amphoteric surfactants.

Suitable amphoteric surfactants are for example betaines of the formula $(R^{iii})(R^{iv})(R^{v})N^+CH_2COO^-$, in which $R^{iii}$ means an alkyl residue with 8 to 25, preferably 10 to 21 carbon atoms optionally interrupted by heteroatoms or groups of heteroatoms and $R^{iv}$ and $R^{v}$ mean identical or different alkyl residues with 1 to 3 carbon atoms, in particular $C_{10}$-$C_{18}$ alkyl dimethyl carboxymethyl betaine and $C_{11}$-$C_{17}$ alkylamidopropyl dimethyl carboxymethyl betaine.

Suitable cationic surfactants are inter alia the quaternary ammonium compounds of formula $(R^{vi})(R^{vii})(R^{viii})(R^{ix})N^+$ $X^-$, in which $R^{vi}$ to $R^{ix}$ denote four identical or different, in particular two long-chain and two short-chain, alkyl residues and $X^-$ denotes an anion, in particular a halide ion, for example didecyldimethylammonium chloride, alkylbenzyldidecylammonium chloride and mixtures thereof.

Perfume

The toilet cleaning product according to the invention contains one or more scents, preferably in a quantity of 0.01 to 10 wt. %, in particular 0.05 to 8 wt. %, more preferably 0.1 to 5 wt. %. d-Limonene may be present as a perfume component. In one more preferred embodiment, the toilet cleaning block according to the invention here contains a perfume prepared from essential oils. Such essential oils which may be used for the purposes of the present invention are for example pine, citrus, jasmine, patchouli, rose, or ylang-ylang oil. Likewise suitable are muscatel sage oil, chamomile oil, lavender oil, clove oil, melissa oil, mint oil, cinnamon leaf oil, lime blossom oil, juniper berry oil, vetiver oil, olibanum oil, galbanum oil and labdanum oil and orange-blossom oil, neroli oil, orange peel oil and sandalwood oil. Further odorants conventionally used in washing and cleaning agents, for instance further essential oils, esters, alcohols, aldehydes, or terpenes, are likewise suitable for use in the toilet cleaning product according to the invention.

Further Ingredients

In addition to the previously stated components, the toilet cleaning product according to the invention may contain further ingredients conventionally used in toilet cleaning products, preferably selected from the group comprising acids, bases, salts, thickeners, antimicrobial active substances, preservatives, complexing agents, bitter substances, polymers, colorants, scents, perfume boosters, fillers, builders, bleaching agents, corrosion inhibitors, erosion regulators, enzymes, microorganisms, active substances for biofilm removal, active substances for inhibiting lime deposits, active substances for reducing adhesion of soiling, active substances for improving processability and mixtures thereof. Overall, no more than 60 wt. %, preferably 0.01 to 60 wt. %, in particular 0.2 to 15 wt. % of further ingredients should be present.

Acids

In order to boost cleaning performance on lime and urine scale, toilet cleaning products according to the invention may contain one or more acids and/or the salts thereof. The acids are preferably produced from renewable raw materials. Suitable acids are therefore in particular organic acids such as formic acid, acetic acid, citric acid, glycolic acid, lactic acid, succinic acid, adipic acid, malic acid, tartaric acid and gluconic acid, and mixtures thereof. The inorganic acids hydrochloric acid, sulfuric acid, phosphoric acid and nitric acid or also amidosulfonic acid or mixtures thereof may, however, additionally be used. The acids and/or the salts thereof are more preferably selected from the group comprising citric acid, lactic acid, formic acid, the salts thereof and mixtures thereof. They are preferably used in quantities of 0.01 to 10 wt. %, more preferably of 0.2 to 5 wt. %.

In a preferred embodiment, the toilet cleaning product according to the invention additionally contains inorganic salts, preferably alkali metal or alkaline earth metal salts, in particular carbonates, sulfates, halides or phosphates and mixtures thereof. Sodium sulfate and/or sodium carbonate are more preferably used. Sodium sulfate may here be present in a quantity of up to 60 wt. %, preferably 0.01 to 60 wt. %, more preferably 20 to 60 wt. %, in particular 35 to 55 wt. %. Sodium carbonate and further salts may be present in a quantity of up to 30 wt. %, preferably up to 10 wt. %, more preferably up to 5 wt. %.

Bases

Alkalis may furthermore be present in toilet cleaning products according to the invention. The bases used in agents according to the invention are preferably those from the group of alkali metal and alkaline earth metal hydroxides and carbonates, in particular sodium carbonate or sodium hydroxide. It is, however, also possible additionally to use ammonia and/or alkanolamines with up to 9 C atoms per molecule, preferably ethanolamines, in particular monoethanolamine.

Antimicrobial Active Substances

Disinfection and sanitizing are one particular kind of cleaning. In a corresponding particular embodiment of the invention, the toilet cleaning product therefore contains one or more antimicrobial active substances preferably in a quantity of 0.01 to 1 wt. %, preferably 0.02 to 0.8 wt. %, in particular 0.05 to 0.5 wt. %, more preferably 0.1 to 0.3 wt. %, extremely preferably 0.2 wt. %. The terms disinfection, sanitizing, antimicrobial action and antimicrobial active substance have the conventional meaning for the purposes of the teaching according to the invention. While disinfection as narrowly defined means the medical practice of killing, theoretically all, infectious microorganisms, sanitizing means the maximally extensive elimination of all microorganisms, including those saprophytic microorganisms which are normally harmless to humans. The extent of disinfection or sanitizing is here dependent on the antimicrobial action of the agent used, which action declines as the content of antimicrobial active substance decreases or the agent becomes increasingly dilute.

Antimicrobial active substances which are suitable according to the invention are for example those from the groups of alcohols, aldehydes, antimicrobial acids or the salts thereof, carboxylic acid esters, acid amides, phenols, phenol derivatives, diphenyls, diphenyl alkanes, urea derivatives, oxygen or nitrogen acetals and formals, benzamidines, isothiazoles and the derivatives thereof such as isothiazolines and isothiazolinones, phthalimide derivatives, pyridine derivatives, antimicrobial surface-active compounds, guanidines, antimicrobial amphoteric compounds, quinolines, 1,2-dibromo-2,4-dicyanobutane, iodo-2-propynyl butylcarbamate, iodine, iodophores, active chlorine-releasing compounds and peroxides. Preferred antimicrobial active substances are preferably selected from the group comprising ethanol, n-propanol, i-propanol, 1,3-butanediol, phenoxyethanol, 1,2-propylene glycol, glycerol, undecenoic acid, citric acid, lactic acid, benzoic acid, salicylic acid, thymol, 2-benzyl-4-chlorophenol, 2,2'-methylene-bis(6-bromo-4-chlorophenol), 2,4,4'-trichloro-2'-hydroxydiphenyl ether, N-(4-chlorophenyl)-N'-(3,4-dichlorophenyl)-urea, N,N'-(1,10-decanediyldi-1-pyridinyl-4-ylidene)-bis-(1-octanamine) dihydrochloride, N,N'-bis(4-chlorophenyl)-3,12-diimino-2,4,11,13-tetraazatetradecane diimide amide, antimicrobial quaternary surface-active compounds, guanidines and sodium dichloroisocyanurate (DCI, 1,3-dichloro-5H-1,3,5-triazine-2,4,6-trione sodium salt). Preferred antimicrobially active surface-active quaternary compounds contain an ammonium, sulfonium, phosphonium, iodonium or arsonium group. It is furthermore also possible to use antimicrobially active essential oils which simultaneously fragrance the cleaning agent. Particularly preferred antimicrobial active substances are, however, selected from the group comprising salicylic acid, quaternary surfactants, in particular benzalkonium chloride, peroxide compounds, in particular hydrogen peroxide, alkali metal hypochlorite, sodium dichloroisocyanurate and mixtures thereof.

Preservatives

The toilet cleaning products according to the invention may likewise contain preservatives. The substances stated in relation to the antimicrobial active substances may essentially be used for this purpose.

Complexing Agents

Complexing agents (INCI Chelating Agents), which are also known as sequestrants, are ingredients which are capable of complexing and inactivating metal ions, for example in order to prevent the disadvantageous effects thereof on the stability or appearance, for example cloudiness, of the toilet cleaning products according to the invention. On the one hand, it is important to complex the calcium and magnesium ions of water hardness which are incompatible with numerous ingredients. On the other hand, complexation of heavy metal ions such as iron or copper delays oxidative decomposition of the finished agents. Complexing agents additionally support the cleaning action.

The following complexing agents, listed by their INCI names, are for example suitable: Aminotrimethylene Phosphonic Acid, Beta-Alanine Diatetic Acid, Calcium Disodium EDTA, Citric Acid, Cyclodextrin, Cyclohexanediamine Tetraacetic Acid, Diammonium Citrate, Diammonium EDTA, Diethylenetriamine Pentamethylene Phosphonic Acid, Dipotassium EDTA, Disodium Azacycloheptane Diphosphonate, Disodium EDTA, Disodium Pyrophosphate, EDTA, Etidronic Acid, Galactaric Acid, Gluconic Acid, Glucuronic Acid, HEDTA, Hydroxypropyl Cyclodextrin, Methyl Cyclodextrin, Pentapotassium Triphosphate, Pentasodium Amino trimethylene Phosphonate, Pentasodium Ethylenediamine Tetramethylene Phosphonate, Pentasodium Pentetate, Pentasodium Triphosphate, Pentetic Acid, Phytic Acid, Potassium Citrate, Potassium EDTMP, Potassium Gluconate, Potassium Polyphosphate, Potassium Trisphosphonomethylamine Oxide, Ribonic Acid, Sodium Chitosan Methylene Phosphonate, Sodium Citrate, Sodium Diethylenetriamine Pentamethylene Phosphonate, Sodium Dihydroxyethylglycinate, Sodium EDTMP, Sodium Gluceptate, Sodium Gluconate, Sodium Glycereth-1 Polyphosphate, Sodium Hexametaphosphate, Sodium Metaphosphate, Sodium Metasilicate, Sodium Phytate, Sodium Polydimethylglycinophenolsulfonate, Sodium Trimetaphosphate, TEA-EDTA, TEA-Polyphosphate, Tetrahydroxyethyl Ethylenediamine, Tetrahydroxypropyl Ethylenediamine, Tetrapotassium Etidronate, Tetrapotassium Pyrophosphate, Tetrasodium EDTA, Tetrasodium Etidronate, Tetrasodium Pyrophosphate, Tripotassium EDTA, Trisodium Dicarboxymethyl Alaninate, Trisodium EDTA, Trisodium HEDTA, Trisodium NTA and Trisodium Phosphate.

Polymers

The toilet cleaning product according to the invention may furthermore contain polymers. These may, for example, serve to reduce lime formation and susceptibility to resoiling.

Preferred polymers are here acrylic polymers, as are for instance commercially obtainable from Rhodia under the trade name Mirapol.

Colorants

The toilet cleaning product according to the invention may contain one or more colorants (INCI Colorants) as further ingredients. Colorants which may be used are both water-soluble and oil-soluble colorants, wherein on the one hand care must be taken to ensure compatibility with further ingredients, for example bleaching agents, and, on the other hand, the colorant used should not have a substantive action towards toilet ceramics, even in the event of extended exposure. The colorants are preferably present in a quantity of 0.0001 to 0.1 wt. %, in particular 0.0005 to 0.05 wt. %, more preferably 0.001 to 0.01 wt. %.

Builders

Water-soluble and/or water-insoluble builders may optionally be used in the toilet cleaning products according to the invention. Water-soluble builders are here preferred as they generally have a lesser tendency to leave insoluble residues behind on hard surfaces. Conventional builders which may be present for the purposes of the invention are low molecular weight polycarboxylic acids and the salts thereof, homopolymeric and copolymeric polycarboxylic acids and the salts thereof, citric acid and the salts thereof, carbonates, phosphates and silicates. Water-insoluble builders include zeolites, which may likewise be used, together with mixtures of the above-stated builder substances.

Bleaching Agents

According to the invention, bleaching agents may be added to the cleaning product. Suitable bleaching agents comprise peroxides, peracids and/or perborates; sodium percarbonate or phthalimidoperoxyhexanoic acid is more preferred. Chlorine-containing bleaching agents such as trichloroisocyanuric acid or sodium dichloroisocyanurate, on the other hand, are less suitable in cleaning agents with an acidic formulation due to the release of toxic chlorine gas vapors, but may be used in alkaline cleaning agents. Under certain circumstances, a bleach activator may be necessary in addition to the bleaching agent.

Corrosion Inhibitors

Suitable corrosion inhibitors (INCI Corrosion Inhibitors) are for example the following substances listed by their INCI names: Cyclohexylamine, Diammonium Phosphate, Dilithium Oxalate, Dimethylamino Methylpropanol, Dipotassium Oxalate, Dipotassium Phosphate, Disodium Phosphate, Disodium Pyrophosphate, Disodium Tetrapropenyl Succinate, Hexoxyethyl Diethylammonium, Phosphate, Nitromethane, Potassium Silicate, Sodium Aluminate, Sodium Hexametaphosphate, Sodium Metasilicate, Sodium Molybdate, Sodium Nitrite, Sodium Oxalate, Sodium Silicate, Stearamidopropyl Dimethicone, Tetrapotassium Pyrophosphate, Tetrasodium Pyrophosphate and Triisopropanolamine.

Erosion Regulators

The primary purpose of the substances designated as erosion regulators is to control consumption of the agent during use in such a manner that the intended service period is observed. Suitable regulators are preferably not only solid long-chain fatty acids, such as stearic acid, but also salts of such fatty acids, fatty acid ethanolamides, such as coconut fatty acid monoethanolamide, or solid polyethylene glycols, such as those with molecular weights between 10000 and 50000.

Enzymes

The toilet cleaning product may also contain enzymes, preferably proteases, lipases, amylases, hydrolases and/or cellulases. They may be added to the agent according to the invention in any form established in the prior art, including solutions of the enzymes, advantageously as concentrated as possible, with a low water content and/or combined with stabilizers. Alternatively, the enzymes may be encapsulated, for example by spray drying or extruding the enzyme solution together with a preferably natural polymer or in the form of capsules, for example those in which the enzymes are enclosed as a solidified gel or in those of the core-shell type, in which an enzyme-containing core is coated with a protective layer which is impermeable to water, air and/or chemicals. Further active substances, for example stabilizers, emulsifiers, pigments, bleaching agents or colorants may additionally be applied in superimposed layers. Such capsules are applied in accordance with per se known methods, for example by agitated or rolling granulation or in fluidized bed processes. Advantageously, such granules are low-dusting, for example due to the application of polymeric film formers, and stable in storage thanks to the coating.

Toilet cleaning products containing enzymes may furthermore contain enzyme stabilizers in order to protect an enzyme present in a toilet cleaning product according to the invention from damage, such as for example inactivation, denaturation or decomposition, for instance due to physical influences, oxidation or proteolytic cleavage. Depending in each case on the enzyme used, suitable enzyme stabilizers are in particular: benzamidine hydrochloride, borax, boric acids, boronic acids or the salts or esters thereof, above all derivatives with aromatic groups, for instance substituted phenylboronic acids or the salts or esters thereof; peptide aldehydes (oligopeptides with a reduced C terminus), aminoalcohols such as mono-, di-, triethanol- and -propanolamine and mixtures thereof, aliphatic carboxylic acids up to $C_{12}$, such as succinic acid, other dicarboxylic acids or salts of the stated acids; end group-terminated fatty acid amide alkoxylates; lower aliphatic alcohols and especially polyols, for example glycerol, ethylene glycol, propylene glycol or sorbitol; and reducing agents and antioxidants such as sodium sulfite and reducing sugars. Further suitable stabilizers are known from the prior art. Combinations of stabilizers are preferably used, for example the combination of polyols, boric acid and/or borax, the combination of boric acid or borate, reducing salts and succinic acid or other dicarboxylic acids or the combination of boric acid or borate with polyols or polyamino compounds and with reducing salts.

Exemplary Embodiments

Toilet cleaning products according to the example 1 to example 3 were produced. Testing was carried out with these compositions to investigate extruding the mixtures, forming a strip-form, biphasic toilet cleaning product with a sine wave shape and cutting pieces of a defined mass from the extruded strand. The cleaning products according to the invention could be extruded and shaped at at most 30° C. and furthermore exhibited no swelling on flushing.

The following table discloses compositions Example 1 to Example 3. All quantities are stated in wt. % active substance.

|  | Example 1 | Example 2 | Example 3 |
| --- | --- | --- | --- |
| Alkyl polyglycoside | 16.45 | — | — |
| Fatty alcohol ether sulfate | — | 7 | 8.4 |
| Secondary alkanesulfonate | — | 19 | 19 |
| Fatty alcohol sulfate | — | 18 | 18 |
| PIB ester | 3.5 | 5 | — |
| 2-Tetradecyloctadecanoic acid | 7 | — | — |
| Silicate | 4 | — | — |
| Silica | 4 | — | — |
| Saponin | 3 | — | — |
| Titanium dioxide | 0.2 | — | — |
| Colorant | + | + | + |
| Perfume oil | 3 | 3.5 | 3.5 |
| Bitrex | + | + | + |
| Sodium sulfate | ad 100% | ad 100% | ad 100% |

The silicates used are here Laponite grades, preferably Laponite RD or Laponite™. The silica is a pyrogenic silica commercially obtainable under the name Aerosil 200. Bitrex is denatonium benzoate (benzyldiethyl-[(2,6-xylylcarbamoyl)methyl]ammonium benzoate).

A further toilet cleaning product according to the invention, Example 4, was formulated in accordance with the following table. Again, all quantities are stated in wt. % active substance.

|  | Example 4 | |
| --- | --- | --- |
|  | Phase 1 | Phase 2 |
| Alkylbenzenesulfonate | 22.10 | 22.10 |
| Alpha-olefinsulfonate | 19.00 | 19.00 |
| Fatty alcohol ethoxylate | 10.00 | 10.00 |
| Fatty acid monoethanolamide | 4.00 | 4.00 |
| Alkyl polyglycoside | 2.50 | 2.50 |
| Paraffin oil | 2.00 | 2.00 |
| Bitter substance | 0.0010 | 0.0010 |
| Trisodium citrate hydrate | — | 1.00 |
| Perfume oil | 4.00 | 4.00 |
| Colorant 1 | + | − |
| Colorant 2 | − | + |
| Sodium sulfate | ad 100 | ad 100 |

Figure 1:
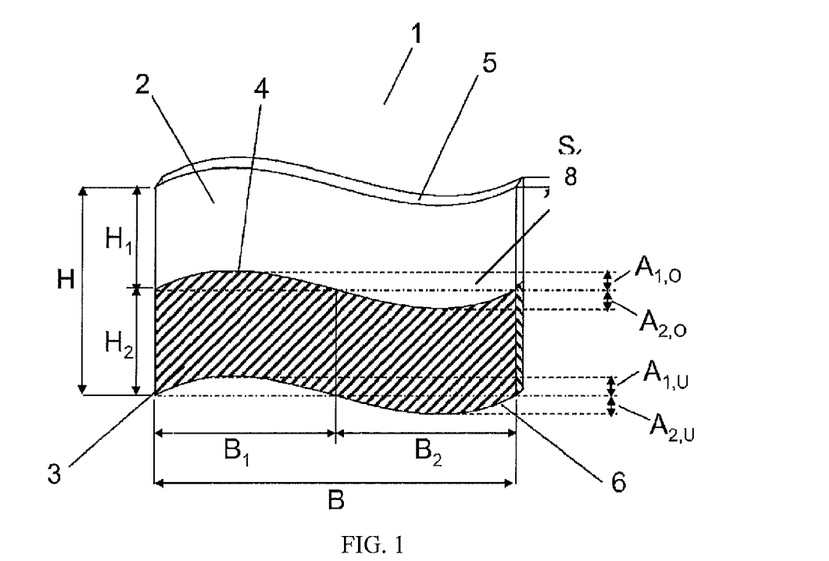
FIG. 1 shows a biphasic, strip-form toilet cleaning product with a sinusoidal contact surface.
Figure 2:
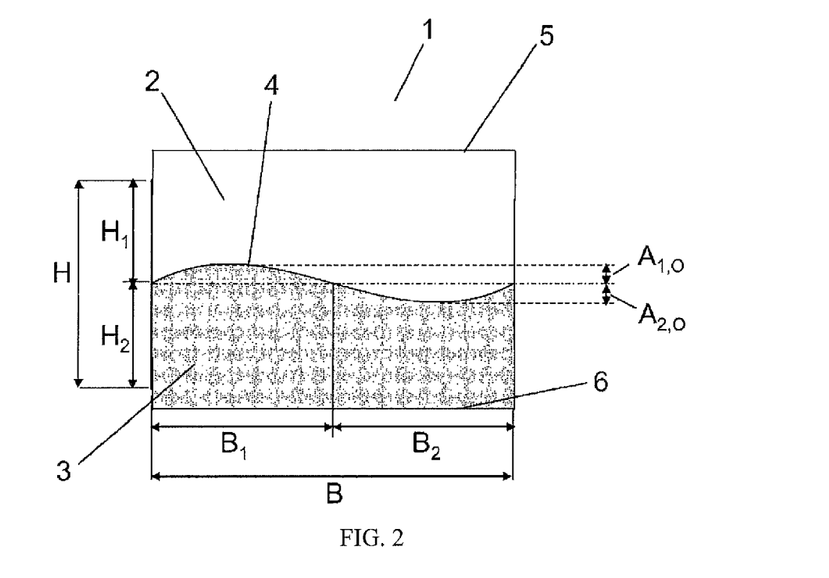
FIG. 2 shows a biphasic, strip-form toilet cleaning product with a sinusoidal contact surface and rectilinear widthwise sides.
Figure 3:
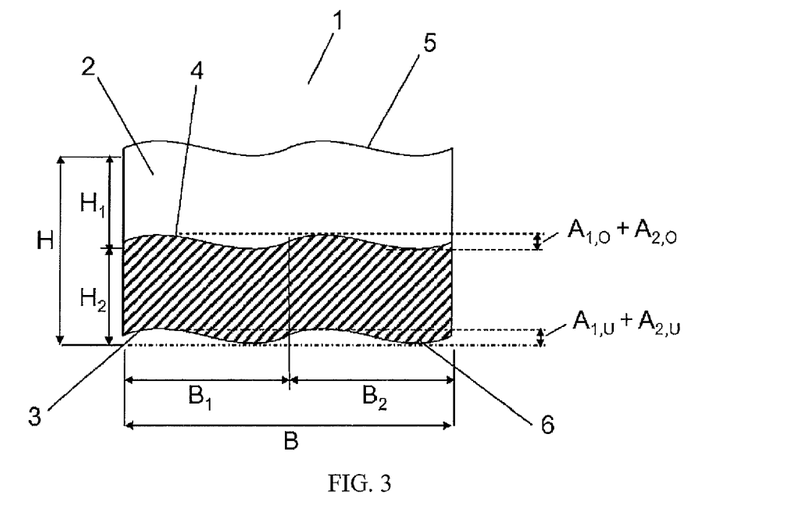
FIG. 3 shows a biphasic, strip-form toilet cleaning product with a biperiodic sinusoidal contact surface.
Figure 4:
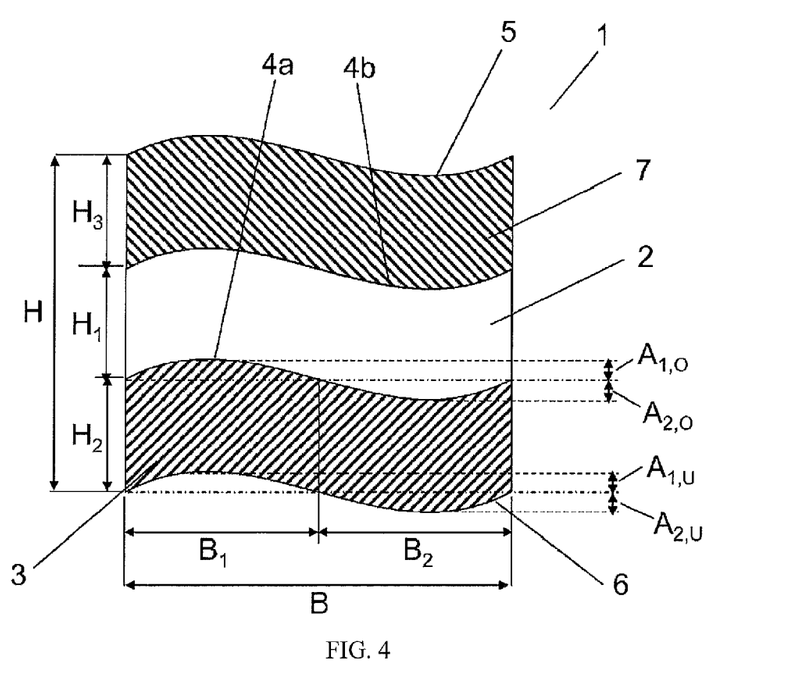
FIG. 4 shows a triphasic, strip-form toilet cleaning product with sinusoidal contact faces.
Figure 5:
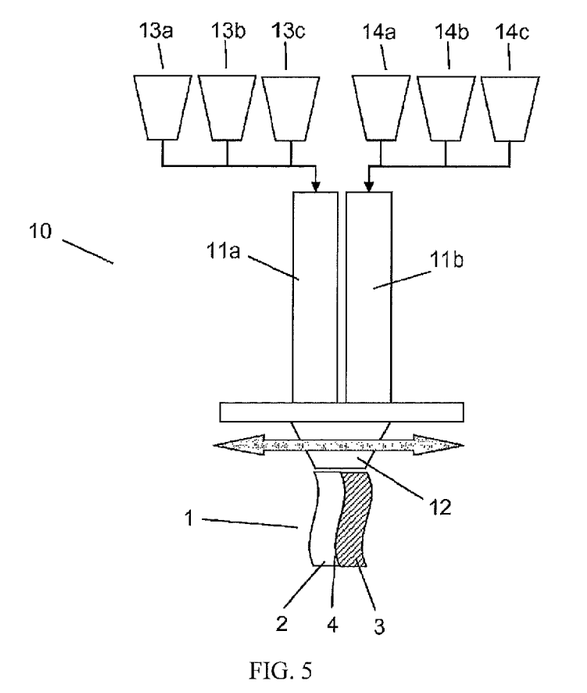
FIG. 5 shows an extruder arrangement with one mobile die.
Figure 6:
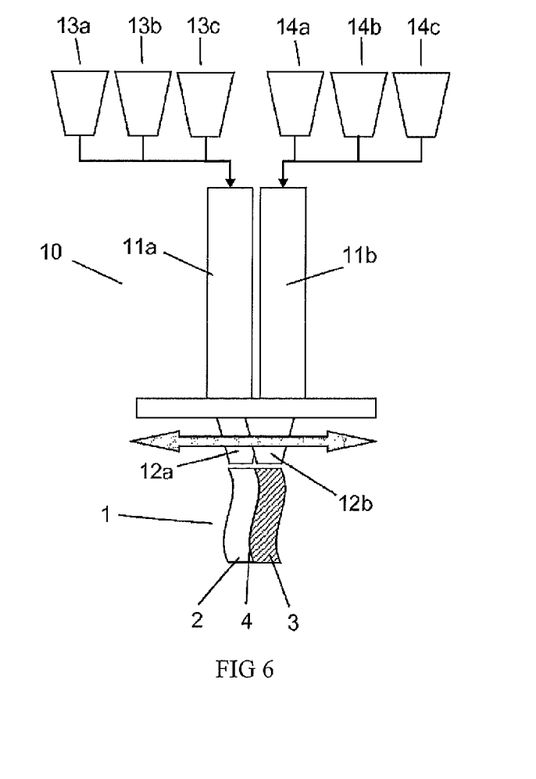
FIG. 6 shows an extruder arrangement with two mobile dies.
Figure 7:
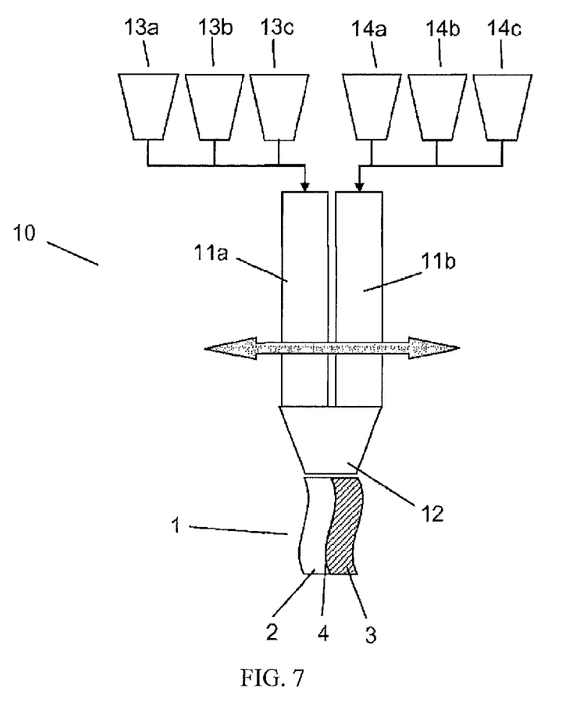
FIG. 7 shows a mobile extruder arrangement with one die.
Figure 8:
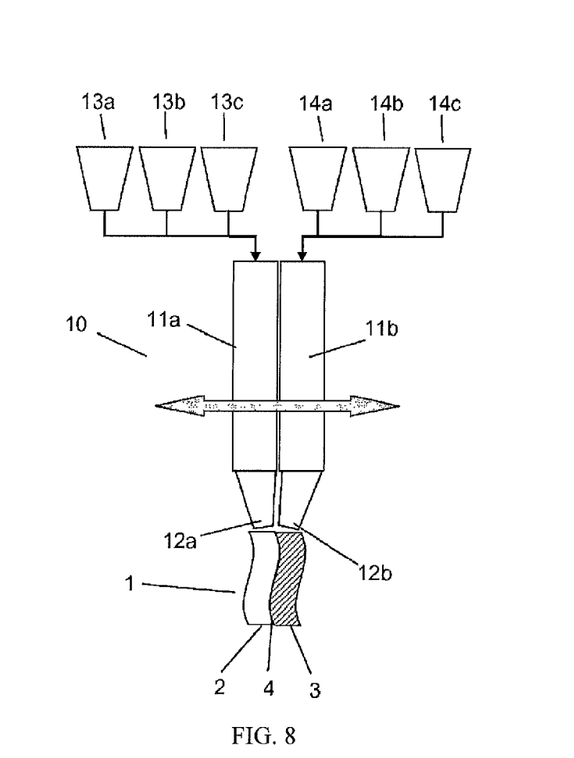
FIG. 8 shows a mobile extruder arrangement with two dies.
Figure 9:
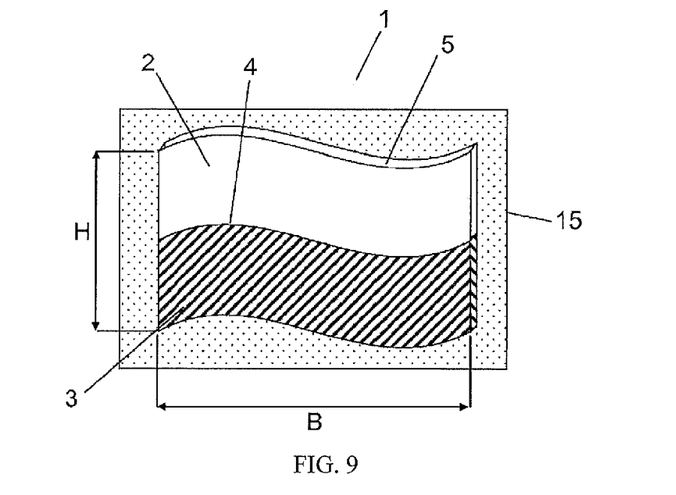
FIG. 9 shows a strip-form cleaning product on a packaging film.

The following exemplary embodiments illustrate the invention in greater detail. In the figures:

FIG. 1 shows a biphasic, strip-form toilet cleaning product with a sinusoidal contact surface FIG. 2 shows a biphasic, strip-form toilet cleaning product with a sinusoidal contact surface and rectilinear widthwise sides FIG. 3 shows a biphasic, strip-form toilet cleaning product with a biperiodic sinusoidal contact surface FIG. 4 shows a triphasic, strip-form toilet cleaning product with sinusoidal contact faces FIG. 5 shows an extruder arrangement with one mobile die FIG. 6 shows an extruder arrangement with two mobile dies FIG. 7 shows a mobile extruder arrangement with one die FIG. 8 shows a mobile extruder arrangement with two dies FIG. 9 shows a strip-form cleaning product on a packaging film FIG. 1 shows a first embodiment of the toilet cleaning product 1 according to the invention. The strip-form toilet cleaning product 1 consists of two phases, a first upper phase 2 and a second lower phase 3, which is drawn crosshatched in FIG. 1.

The toilet cleaning product 1 has a total height H, the individual phases 2, 3 in each case having a height $H_1$ and $H_2$. In the example shown, the two phases 2, 3 have the same height $H_1=H_2$. The height of the example shown amounts to between 25 and 30 mm. The total width B of the toilet cleaning product shown is between 60 and 65 mm, the thickness S of the toilet cleaning product being 4-5 mm.

As can be seen from FIG. 1, the toilet cleaning product 1 has, along the center axis 8, a contact surface 4 between the upper phase 2 and lower phase 3. The contact surface 4 extends in the form of a sine wave about the center axis 8. The amplitude of the sine wave about the center axis 8 amounts to $A_{1,O}$, wherein in the example shown the amplitude $A_{1,O}=A_{2,O}$. In the example shown, the wavelength of the sine wave is equal to the total width B of the toilet cleaning product.

As is likewise readily apparent from FIG. 1, the widthwise sides 5, 6 which define the toilet cleaning product 1 have the same contour as the contour of the contact surface 4, namely in the form of a sine wave, the sine wave of the widthwise sides 5, 6 and of the contact surface 4 extending parallel to one another. In the example shown, widthwise sides 5, 6 configured in the form of a sine wave have an amplitude of $A_{1,U}$, wherein $A_{1,U}=A_{2,U}=A_{1,O}=A_{2,O}$.

In the example shown, the amplitude $A_{1,U}=A_{2,U}=A_{1,O}=A_{2,O}=2.5$ mm.

FIG. 2 shows a modification of the strip-form toilet cleaning product 1 known from FIG. 1. The toilet cleaning product 1 shown in FIG. 2 likewise has a first upper phase 2 and a second lower phase 3, the contact surface between the two phases 2, 3 being of sinusoidal configuration. In the exemplary embodiment shown, the upper widthwise side 5 and the lower widthwise side 6 are of rectilinear configuration, such that the toilet cleaning product has a rectangular basic shape.

FIG. 3 shows a further modification of the strip-form toilet cleaning product 1 known from FIG. 1. As is apparent, the periodic length of the sinusoidal contact surface between the first upper phase 2 and second lower phase 3 is approximately 0.5 times the width B of the toilet cleaning product 1. A periodic length of the sinusoidal contact surface 4 thus corresponds to $B_1=B_2$, wherein $B_1=B_2=B/2$.

Again starting from the strip-form toilet cleaning product 1 known from FIG. 1, FIG. 4 shows a possible triphasic development of the toilet cleaning product 1.

The triphasic toilet cleaning product 1 has two contact faces 4a, 4b, the first upper contact surface 4a being located between the uppermost phase 7 and middle phase 2 and the second lower contact surface being located between the middle phase 2 and lower phase 3. Both phases are of sinusoidal configuration and extend parallel to one another.

Production Methods

One possible method for producing the toilet cleaning product according to the invention is explained in greater detail below, also with reference to FIGS. 5-8.

Extrusion methods for producing toilet cleaning products are known in principle from the prior art and a person skilled in the art therefore requires no further explanation of this process at this point.

In principle, the method for producing the strip-form, multiphase toilet cleaning products according to the invention consisting of at least two phases comprises the following steps:
a) mixing the components in each case for the individual phases,
b) extruding the individual strands for the various phases,
c) bringing the individual strands together in a common die or in each case separate dies, such that a contact surface is formed between the strands, wherein the die or dies carries/carry out an oscillatory, preferably a linearly oscillatory, particularly preferably a harmonically oscillatory movement.

A preferred method, as shown in FIG. 5, for producing strip-form, multiphase toilet cleaning products consisting of at least two phases comprises the steps:
a) mixing the components in each case for the individual phases,
b) extruding the individual strands 2, 3 for the various phases,
c) bringing the individual strands together in a die 12, such that a contact surface 4 is formed between the strands 2, 3, wherein the die 12 carries out an oscillatory, preferably a linearly oscillatory, particularly preferably a harmonically oscillatory movement.

The individual formulation ingredients of the two phases are stored in the corresponding reservoirs 13a-c for the first phase and in the reservoirs 14a-c for the second phase and supplied in the desired mixture ratios to an extruder 11a for the first phase and an extruder 11b for the second phase. At the outlet of the extruder 11a, 11b is arranged a die 12 in which the two extruded strands 2, 3 are brought together and discharged via a common orifice, the strands 2, 3 being brought together in such a manner that a contact surface 4 is formed between the strands 2, 3. As indicated by the arrow over the die 12, the die carries out an oscillatory, preferably a linearly oscillatory, particularly preferably a harmonically oscillatory movement, such that the toilet cleaning product assumes a wavy basic shape as shown in FIG. 5.

A further, preferred method, illustrated in FIG. 6, for producing strip-form, multiphase toilet cleaning products consisting of at least two phases comprises the steps:
a) mixing the components in each case for the individual phases,
b) extruding the individual strands 2, 3 for the various phases,
c) bringing the individual strands 2, 3 together in each case in a separate die 12a, 12b, wherein the dies 12a, 12b are arranged and configured relative to one another in such a manner that a contact surface 4 is formed between the strands 2, 3, wherein the dies 12a, 12b carry out a simultaneous oscillatory, preferably a linearly oscillatory, particularly preferably a harmonically oscillatory movement.

In contrast with the method shown in FIG. 5, the method according to FIG. 6 does not have a common die for the two extruders 11a, 11b, but instead each extruder 11a, 11b has its own discharge die 12a, 12b for the respective extruded strand 2, 3. The dies 12a, 12b are preferably oriented to face one another, such that the extruded strands 2, 3 can form a sufficiently good contact surface 4.

FIG. 7 shows a further, preferred method for producing strip-form, multiphase toilet cleaning products consisting of at least two phases comprising the steps:
a) mixing the components in each case for the individual phases,
b) extruding the individual strands 2, 3 for the various phases,
c) bringing the individual strands 2, 3 together in a die 12, such that a contact surface 4 is formed between the strands 2, 3, wherein the extruders 11a, 11b with the die 12 carry out a simultaneous oscillatory, preferably a linearly oscillatory, particularly preferably a harmonically oscillatory movement.

In contrast with the method variants known from FIGS. 5-6, the die 12 is fixedly connected to the extruder 11a, 11b, wherein the extruders 11a, 11b and the die 12 carry out a simultaneous oscillatory, preferably a linearly oscillatory, particularly preferably a harmonically oscillatory movement, as indicated by the arrow over the extruder 11a, 11b.

Finally, as shown in FIG. 8, it is also possible for the arrangement or method known from FIG. 7 to be provided with two dies 12a, 12b which are separate from one another, such that this case amounts to a combination of the arrangements or methods known from FIG. 6 and FIG. 7.

The extruded strands 2, 3 of the strip-form cleaning product 1 are applied onto a deposition belt which is not explicitly depicted in FIGS. 5-8. The deposition belt preferably moves at a speed which corresponds to the discharge velocity of the extruded strands 2, 3 from the die(s), such that stretching or compression of the extruded strands on application onto the deposition belt is avoided.

It is, of course, also conceivable to set the speed of the deposition belt such that the extruded strands are stretched in a desired manner.

Alternatively to the above-stated method variants, in which the deposition belt onto which the strands 2, 3 from the die(s) 12, 12a, 12b are applied is motionless except in the direction of extrusion, it is however also possible for the extruder head or the die to be motionless, while the deposition belt onto which the strip-form cleaning product is applied after emerging from the die(s) carries out an oscillatory, preferably a linearly oscillatory, particularly preferably a harmonically oscillatory movement, such that a wavy toilet cleaning product as previously described is formed.

It is preferred for the extruder to be a planetary roller extruder, in particular with fluted rollers.

It is moreover advantageous to chill the strip-form, multiphasic toilet cleaning products which have emerged from the die or dies and to cut them in the chilled state, whereby it is possible to avoid adhesion to the cutting tool and to form smooth cut edges on the toilet cleaning product. The toilet cleaning products may furthermore be more readily detached from the deposition belt when in the chilled state.

It is more preferable for the extruded toilet cleaning product to be chilled prior to cutting to a temperature of between −10° C. and +15° C., particularly preferably between −5° C. and +10° C., particularly preferably between 0° C. and 10° C.

It is furthermore to provide the interior of a die with a non-stick coating, such as for example Teflon.

The surface of the deposition belt onto which the strip-form toilet cleaning product is extruded is advantageously siliconized, such that product adhesion is minimized or entirely avoided.

It should be emphasized at this point that a separate adhesive is preferably not used for adhesively bonding the extrudate phases. A bonded joint between the extrudate phases is made solely on the basis of the adhesion properties of the extrudate phases and their being brought together mechanically by the dies.

Packaging of the Strip-Form Toilet Cleaning Product

A strip-form toilet cleaning product is preferably stored in an individual dispensing pouch, wherein a plurality of these individual dispensing pouches are stored in a further storage container, such as for example a box of plastic or cardboard.

An individual dispensing pouch is in particular a film pouch formed from a plastics film which, in the closed state of the pouch, completely encloses the strip-form toilet cleaning product. A corresponding configuration is shown by way of example in FIG. 9.

FIG. 9 shows the toilet cleaning product known from FIG. 1, wherein said product adheres to the pouch film 15 on an unsealed individual dispensing pouch.

A closure seam, for example a sealed seam, such as a heat-sealed or contact adhesive-sealed seam, weld seam or adhesive seam, is conventionally formed on at least one side edge of the individual dispensing pouch. Depending on the manner of production, flat pouches may for example correspondingly have three or four sealed seams on three or four side edges. A tubular pouch may in turn have an upper and an opposing, lower crosswise seam and a back seam, such as an overlapping or pleated back seam.

Since the sealed or welded seams can be torn apart only with difficulty, it is advantageous to facilitate tearing open such pouch packages for example by providing a notch on one of the weld seams which close the package. These notches are intended to reduce the tearing strength of the weld or seal seams, such that the pouch package can be torn open without using an additional tool, such as for example a pair of scissors.

Tearing open conventionally proceeds along a tear line, along which the individual dispensing pouch is divided at least in places into at least two parts and which passes at least in places through the contents space of the pouch. The toilet cleaning product may then be taken out in any desired manner through the resultant hole in the package.

It is alternatively also possible for the individual dispensing pouch to have an offset back seam, the offset preferably amounting to between 3 and 10 mm. Using this offset, the user can grasp the two film ends along the back seam and pull them apart, such that the individual dispensing pouch can be opened along its entire back seam. A peelable, multilayer film formed from PE on the inside and a metallized PET film on the outside is preferable in this case. It is particularly preferred for the peelable, multilayer film to be composed of a 20-70 µm thick peelable PE film and a 10-20 µm thick metallized PET layer.

The individual dispensing pouch is preferably manufactured from a flexible plastics material. It is more preferred to produce the pouch from a mono- or biaxially oriented PP film. In general, preferred plastics are any desired such materials which have a pronounced orientation, for example due to stretching, such that they can readily be split in rectilinear manner.

In particular, the film material is impermeable to water vapor. The film material may also be heat-shrinkable.

It is preferred to manufacture the individual dispensing pouch from a multilayer packaging material. The individual material layers may be lacquer layers, metal foils, metallized layers or films of plastics, in particular thermoplastics or composites made from metal foils and plastics films. One or more material layers may be extruded and in particular melt-extruded layers or films of thermoplastics, sometimes combined with metal foils or plastics films. At least one material layer may be a lacquer layer, such as a clear lacquer, a colored lacquer coat, a hot-melt coating etc. At least one material layer may be a metallized layer or a vacuum-deposited ceramic thin film.

The thermoplastic material layers may be transparent, translucent or opaque. The material layers, in particular the material layers or films arranged outermost on a package, may have print on them.

The wall thickness of the packaging film amounts for example to 10-500 µm, preferably 30 to 300 µm, in particular 35 to 150 µm.

Metal foils which may for example be used are steel foils and preferably aluminum foils, the thickness of the foils being for example from 5 to 100 µm, preferably from 8 to 45 µm, in particular from 10 to 35 µm.

Suitable plastics films are conveniently made from thermoplastics, such as polyesters, polyolefins, for example polypropylenes or polyethylenes, or such as polyamides, polyvinyl chloride, polycarbonate or from cellulose-containing materials, such as cellophane or paper. The plastics films may take the form of monofilms or film composites. The thickness of the plastics films may be for example from 8 to 100 µm, preferably from 12 to 35 µm, and in particular 12 to 23 µm.

Extruded or melt-extruded layers may for example be made from polyolefins, such as polypropylenes or polyethylenes. The thickness of the extrudates may be for example from 8 to 100 µm, preferably from 12 to 30 µm, and in particular 12 to 23 µm.

The strip-form toilet cleaning product adheres with at least one flat side on the interior surface of the individual dispensing pouch. The adhesion of the toilet cleaning product to the interior surface of the pouch is here lower than the adhesion of the toilet cleaning product to a ceramic surface in the interior of a toilet bowl, such that, on application in the interior of a toilet bowl, the toilet cleaning product on the one hand remains stuck on the ceramic surface and the pouch film can readily be peeled off the toilet cleaning product. This has the advantage that the user has no skin contact with the toilet cleaning product during the application process, since the opened individual portion pouch separates the user's hand from the toilet cleaning product during the application process. The application process will now be described in greater detail to clarify what is meant here.

The user first of all takes an individual dispensing pouch which is filled with the toilet cleaning product. In order to apply the toilet cleaning product, the user opens the individual dispensing pouch wherein the toilet cleaning product remains stuck on an inner side of the pouch and does not become detached from the surface and fall off. The user holds the individual dispensing pouch and uses it to press the toilet cleaning product onto the toilet surface, such that the user's hand does not come into contact with the toilet cleaning product. Finally, the user peels the individual dispensing pouch from the toilet cleaning product which is adhered to the toilet surface and disposes of the pouch.

In order to stick the strip-form toilet cleaning product detachably to the inner side of the individual dispensing pouch, the toilet cleaning product or the corresponding side of the individual dispensing pouch is exposed to a pressure of between 5 and 15 N/cm², preferably between 7 and 10 N/cm² at 20° C. This ensures that the toilet cleaning product adheres sufficiently detachably to the film of the individual dispensing pouch, so preventing unwanted detachment of the toilet cleaning product from the film when the individual dispensing pouch is opened.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A strip-form toilet cleaning product for application in the interior of a toilet bowl comprising
   a width (B), a height (H) and a thickness (S), wherein the ratio between width (B), height (H) and thickness (S) is between 1:1:0.01 and 1:0.1:0.2,
   a first extruded phase and
   at least one second extruded phase, wherein the first phase differs from at least the second phase, wherein however all the phases comprise at least one adhesion promoter at least on the side of the toilet cleaning product to be applied onto the toilet bowl and
   the first phase and at least the second phase have a contact surface with one another wherein
   at least the contour of a contact surface along the center axis takes the form of a sine wave which has an amplitude of $A_{1,O}$, wherein the ratio of amplitude to width (B) $A_{1,O}$:B amounts to between 1:10 and 1:25 and the periodic length of the sine wave corresponds to 0.1-1 times the width (B) of the toilet cleaning product.

2. The strip-form toilet cleaning product according to claim 1, characterized in that the first phase and the at least second phase have the same width (B).

3. The strip-form toilet cleaning product according to claim 1, characterized in that the first phase and at least the second phase have substantially the same height.

4. The strip-form toilet cleaning product according to claim 1, characterized in that the first phase and at least the second phase have substantially the same thickness (S).

5. The strip-form toilet cleaning product according to claim 1, characterized in that the two widthwise sides which define the toilet cleaning product have a contour which substantially corresponds to the contour of the contact surface.

6. The strip-form toilet cleaning product according to claim 1, characterized in that at least one adhesion promoter is added to the toilet cleaning product.

7. The strip-form toilet cleaning product according to claim 1, characterized in that it contains at least one surfactant.

8. The strip-form toilet cleaning product according to claim 7, characterized in that the at least one surfactant is selected from the group of nonionic surfactants, anionic surfactants and mixtures thereof.

9. The strip-form toilet cleaning product according to claim 1, characterized in that it contains further ingredients conventionally present in toilet cleaning products, preferably selected from the group comprising acids, bases, salts, thickeners, antimicrobial active substances, preservatives, complexing agents, bitter substances, polymers, colorants, scents, perfume boosters, fillers, builders, bleaching agents, corrosion inhibitors, erosion regulators, enzymes, microorganisms, active substances for biofilm removal, active substances for inhibiting lime deposits, active substances for reducing adhesion of soiling, active substances for improving processability and mixtures thereof.

10. The strip-form toilet cleaning product according to claim 1, characterized in that the toilet cleaning product comprises at least one adhesion promoter in the form of a single- or double-sided adhesive strip or an adhesive applied over an extensive area or in spots, which is arranged on the side of the toilet cleaning product which is applied in the interior of the toilet bowl.

11. A method for producing strip-form, multiphase toilet cleaning products, in particular the strip-form toilet cleaning product according to claim 1, consisting of at least two phases comprises the steps:
   a) mixing the components in each case for the individual phases,
   b) extruding the individual strands for the various phases,
   c) bringing the individual strands together in a common die or in each case separate dies, such that a contact surface is formed between the strands, wherein the die or dies carries/carry out an oscillatory movement.

12. A method for producing strip-form, multiphase toilet cleaning products according to claim 1, consisting of at least two phases comprises the steps:
   a) mixing the components in each case for the individual phases,
   b) extruding the individual strands for the various phases,
   c) bringing the individual strands together in a common die or in each case separate dies, such that a contact surface is formed between the strands, wherein the extruders with the die or dies carry out a simultaneous oscillatory movement.

13. An individual dispensing pouch storing the strip-form toilet cleaning product according to claim 1, characterized in that the strip-form toilet cleaning product adheres with at least one flat side to the interior surface of the individual dispensing pouch, wherein the adhesion of the toilet cleaning product to the interior surface of the pouch is lower than the adhesion of the toilet cleaning product to a ceramic surface in the interior of a toilet bowl.

* * * * *